W. M. GENTLE.
BOX MAKING MACHINE.
APPLICATION FILED APR. 11, 1907.
914,820.
Patented Mar. 9, 1909.
8 SHEETS—SHEET 1.
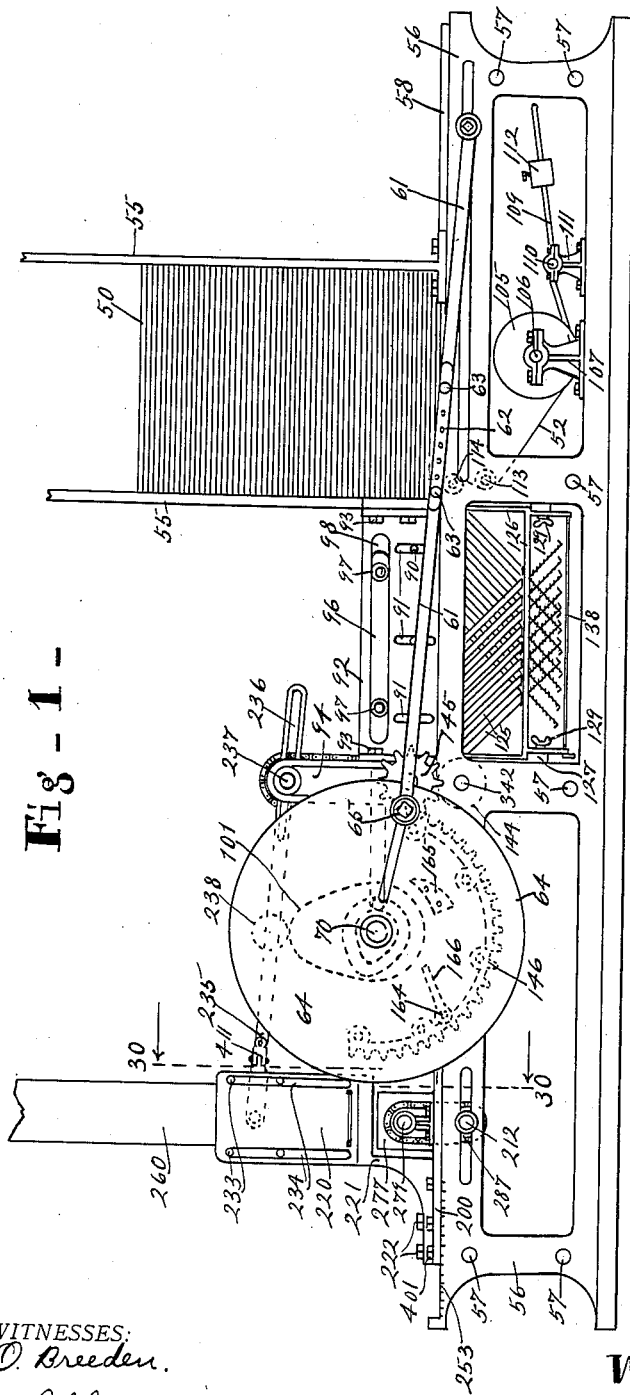
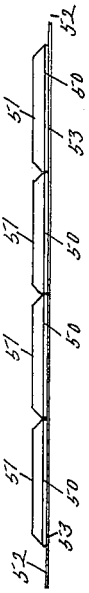
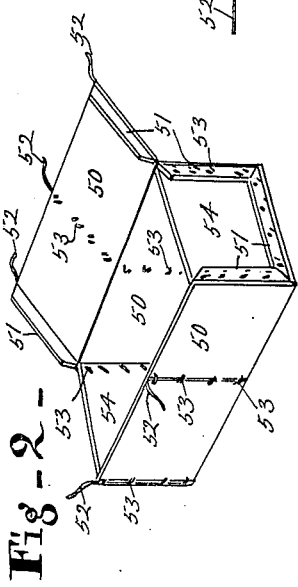
WITNESSES:
O. Breeden.
N. Allmong.
INVENTOR.
William M. Gentle.
BY
V. H. Lockwood
ATTORNEY.

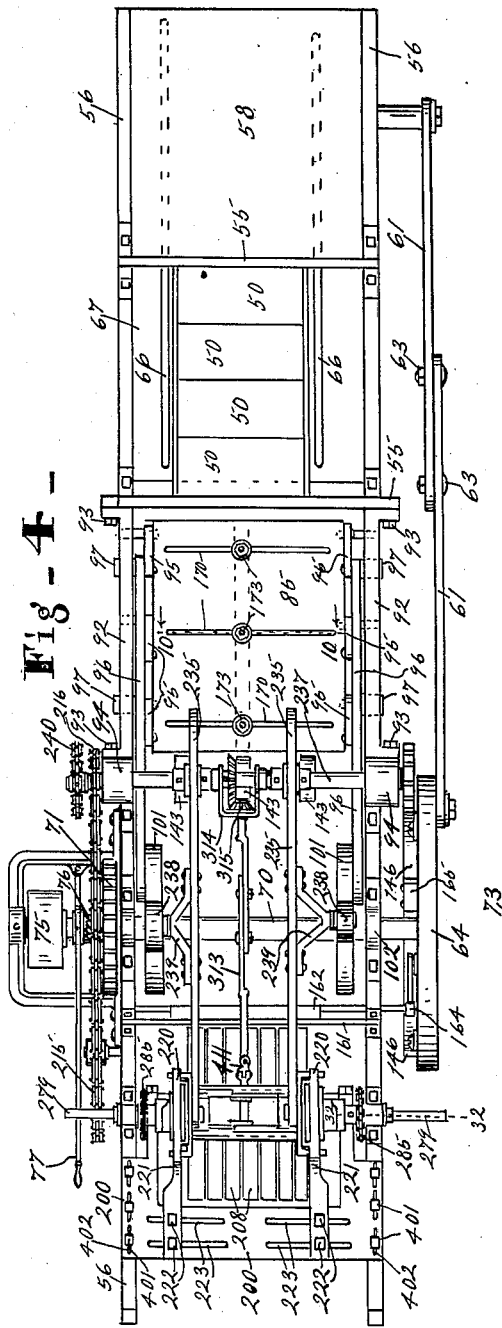
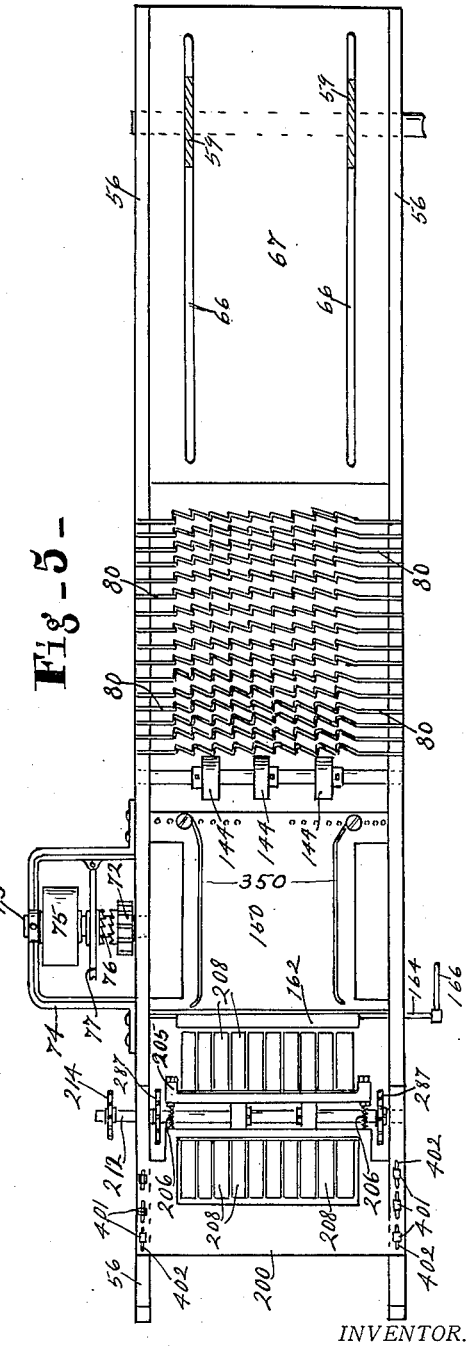

W. M. GENTLE.
BOX MAKING MACHINE.
APPLICATION FILED APR. 11, 1907.
914,820.
Patented Mar. 9, 1909.
8 SHEETS—SHEET 3.
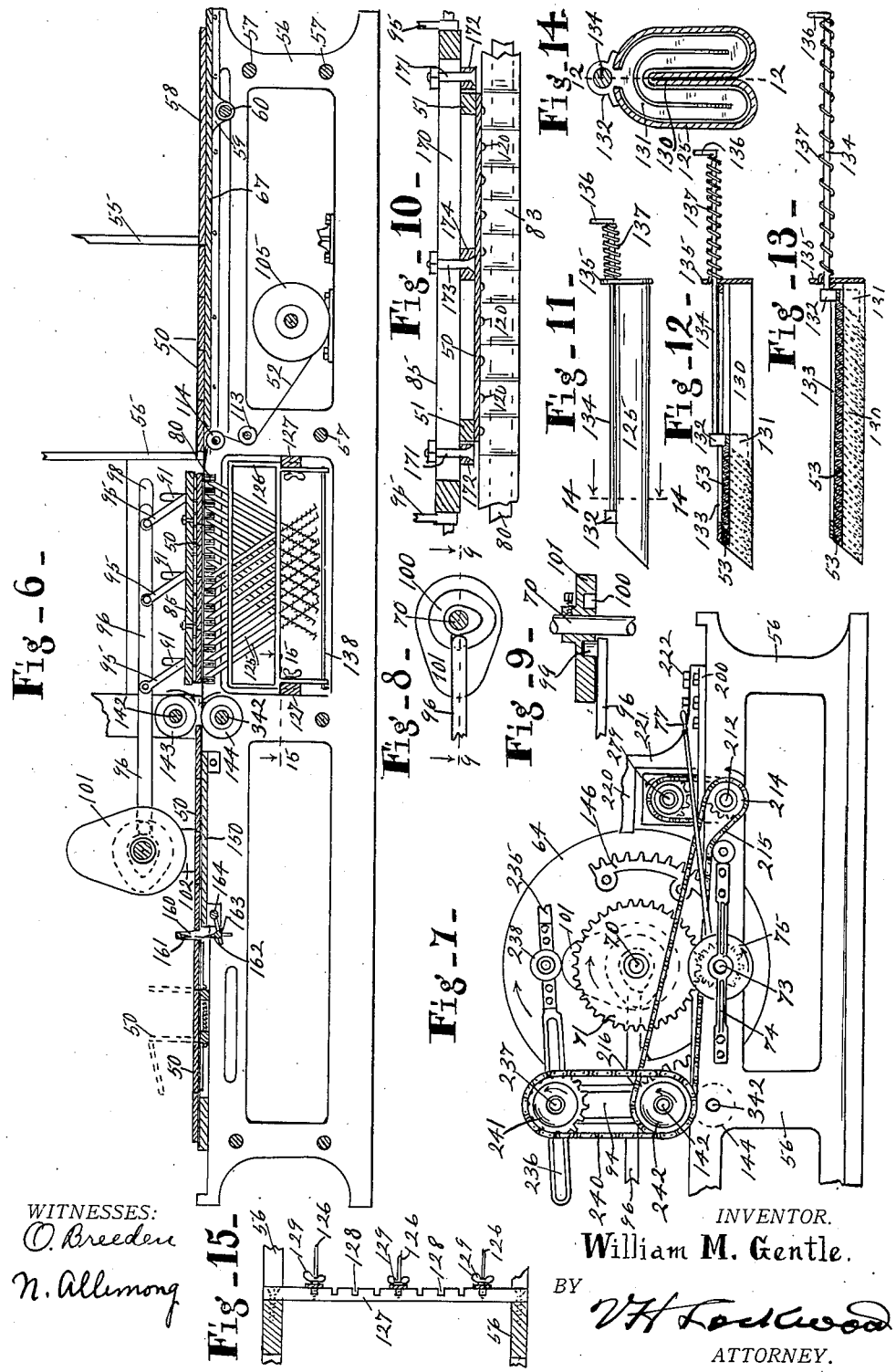
WITNESSES:
O. Breeden
N. Allmong
INVENTOR.
William M. Gentle.
BY V. H. Lockwood
ATTORNEY.

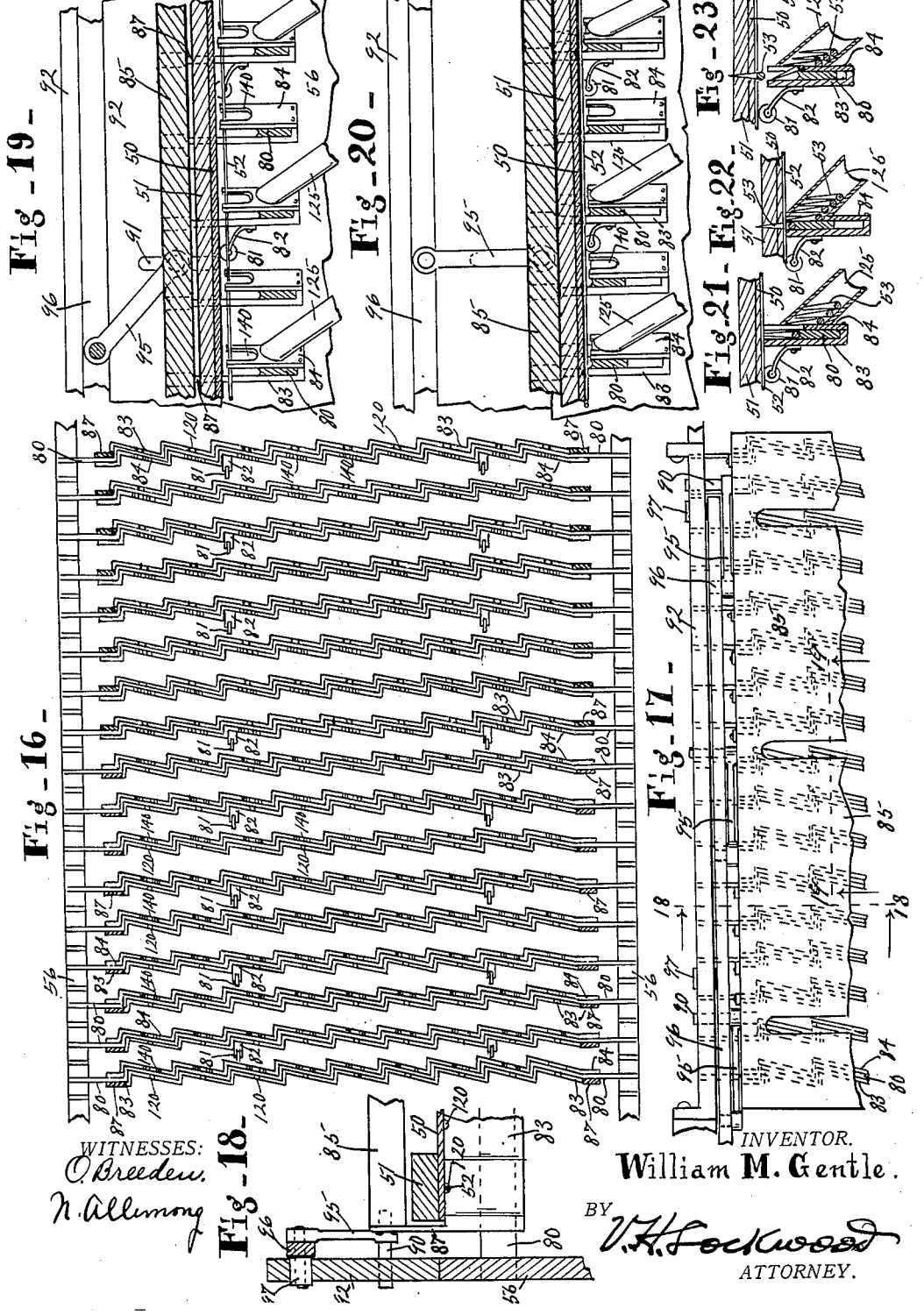

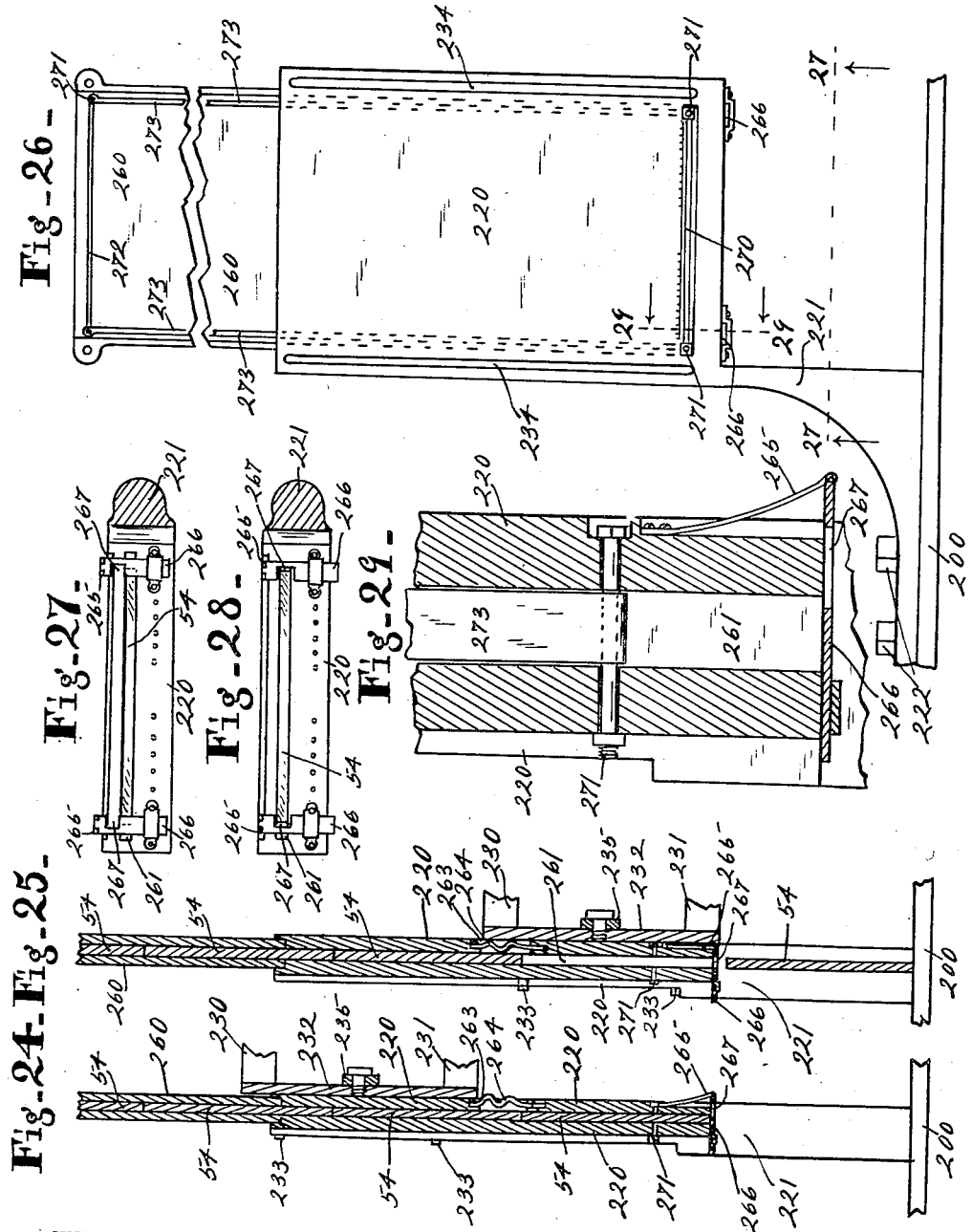

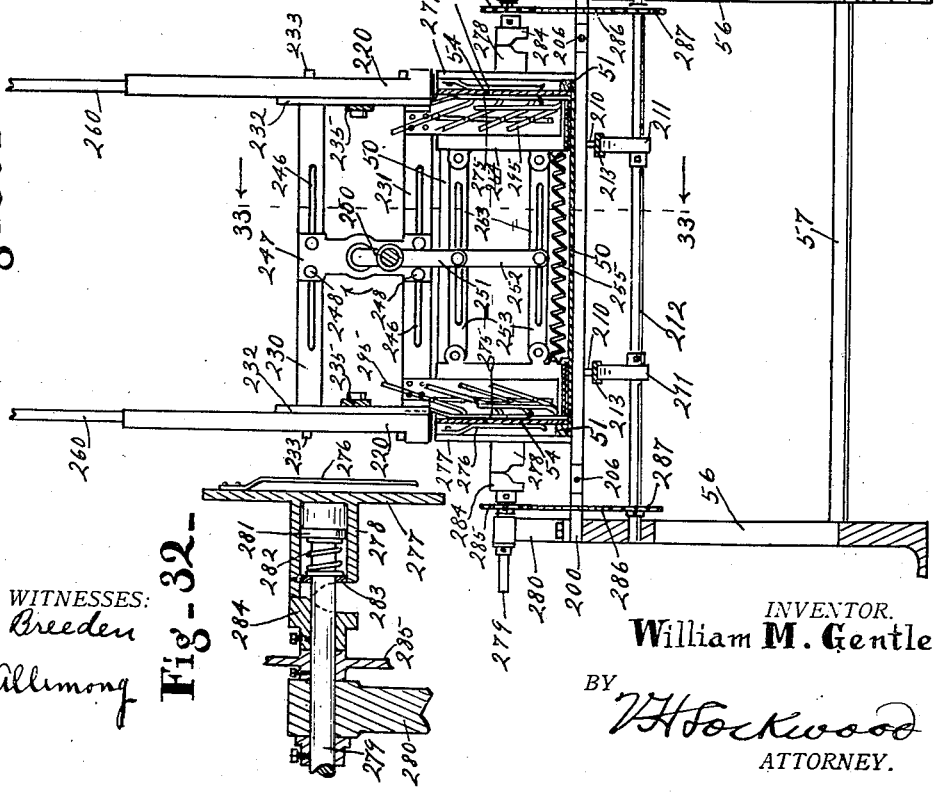

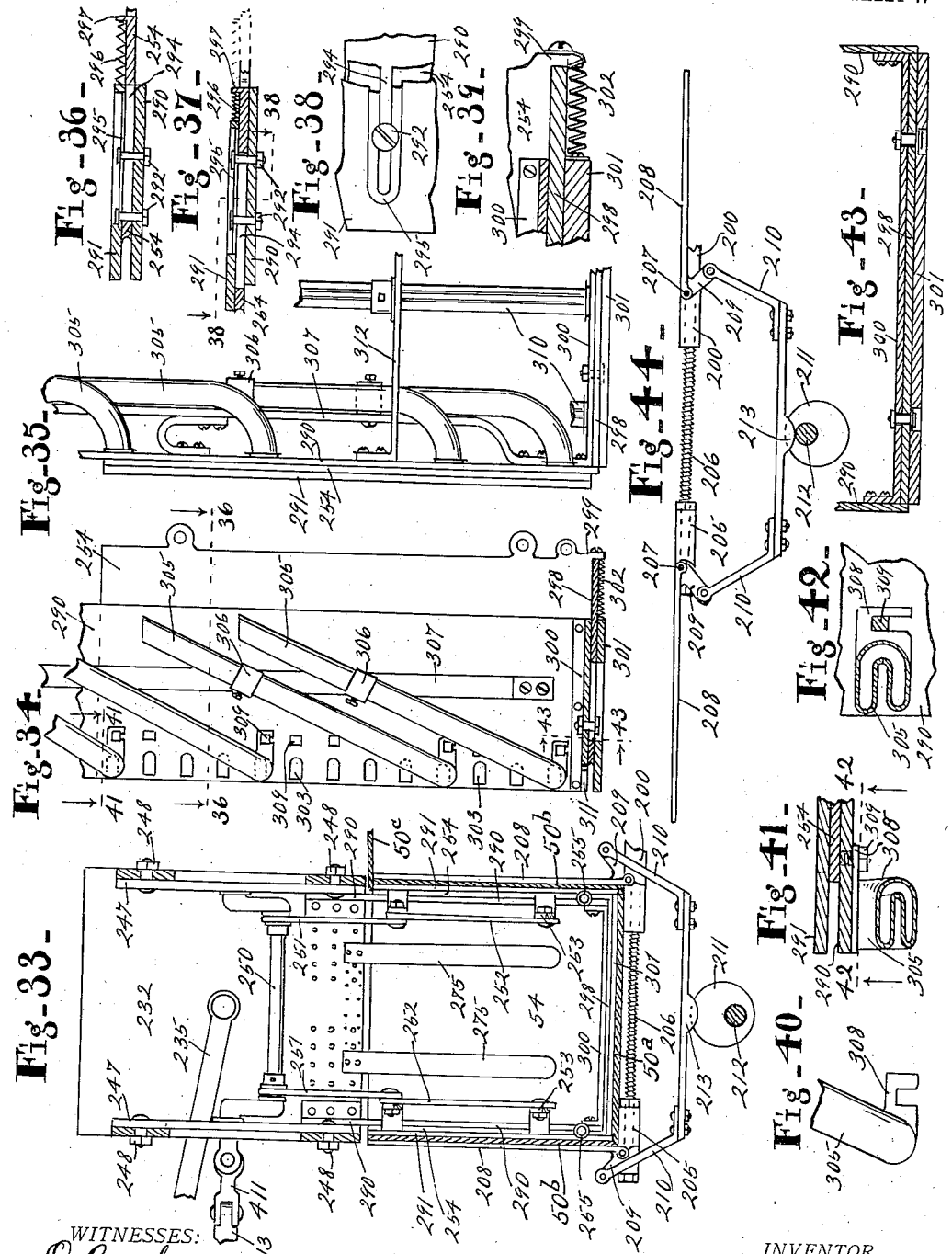

W. M. GENTLE.
BOX MAKING MACHINE.
APPLICATION FILED APR. 11, 1907.
914,820.
Patented Mar. 9, 1909.
8 SHEETS—SHEET 8.
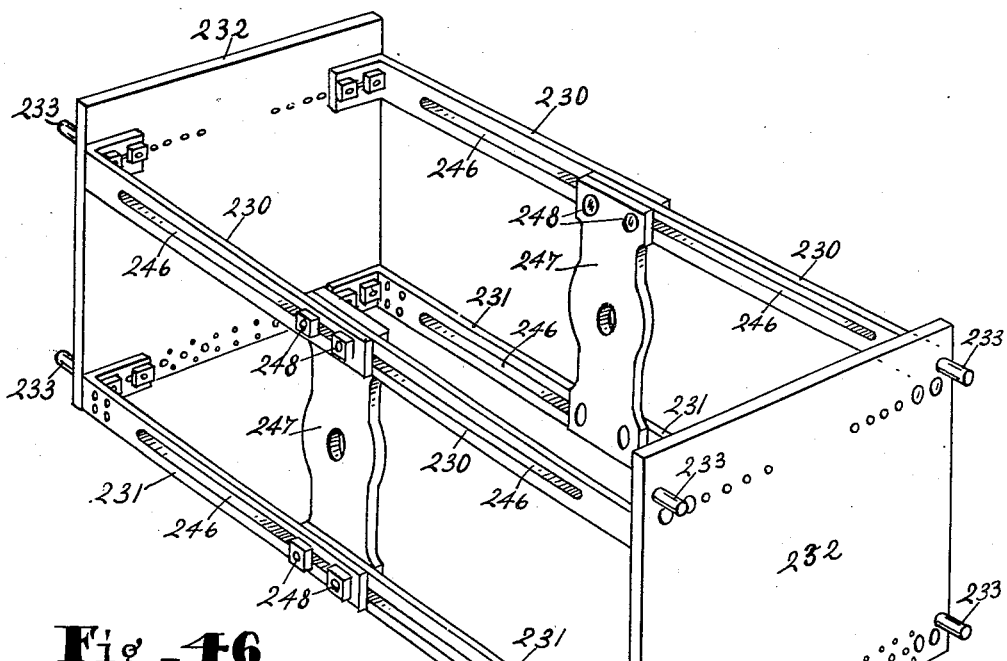
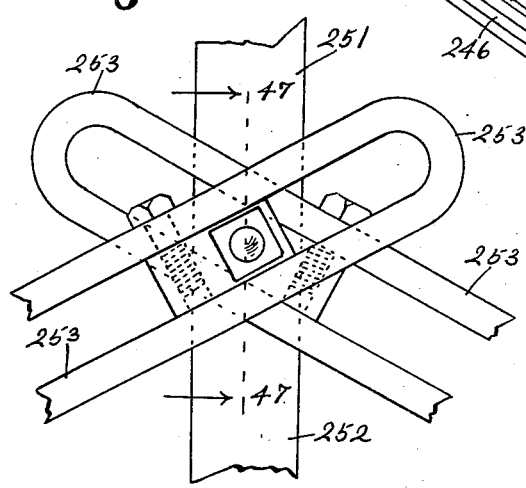
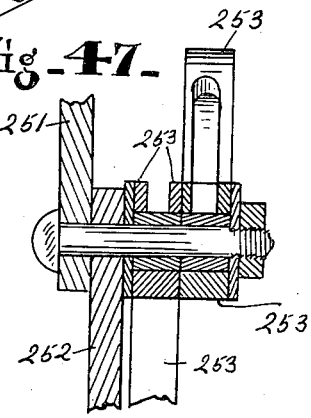
WITNESSES:
Irene D. Burkhart.
O. M. McLaughlin
INVENTOR.
William M. Gentle.
BY
V. H. Lockwood.
ATTORNEY.

UNITED STATES PATENT OFFICE.

WILLIAM M. GENTLE, OF SOUTHPORT, INDIANA, ASSIGNOR TO GEORGE W. LADLEY, OF INDIANAPOLIS, INDIANA.

BOX-MAKING MACHINE.

No. 914,820.          Specification of Letters Patent.          Patented March 9, 1909.

Application filed April 11, 1907. Serial No. 367,504.

*To all whom it may concern:*

Be it known that I, WILLIAM M. GENTLE, of Southport, county of Marion, and State of Indiana, have invented a certain new and useful Box-Making Machine; and I do hereby declare that the following is a full, clear, and exact description thereof, reference being had to the accompanying drawings, in which like numerals refer to like parts.

The object of this invention is to provide a machine that will make strong boxes and do the entire work connected with the making of the boxes after the boards and wire are supplied to it for the boxes.

This machine takes four boards with which it forms the bottom sides and top of the box, by securing binding wires to them with staples, and also securing the end boards to the boxes with staples, and leaving the lid of the box hinged at one side to open. This makes a very strong box and yet one that is quite cheap since it is made wholly by machinery.

The features of invention will appear from the claims which will be understood from the following description and the accompanying drawings.

Figure 1 is a side elevation of the right hand side of the device, parts being shown by dotted lines. Fig. 2 is a perspective view of a box made by said machine. Fig. 3 is an elevation of the end of one of the flats from which the box is made. Fig. 4 is a plan view of the machine. Fig. 5 is a plan view of the frame with the upper parts removed from the frame, parts being in section and parts broken away. Fig. 6 is a central vertical section through the machine with the folding mechanism removed. Fig. 7 is an elevation of a portion of the left hand side of the machine, showing the driving mechanism, parts being broken away. Fig. 8 is a side elevation of the cam that operates the stapling plate the shaft being in section and the connecting bar being partly broken away. Fig. 9 is a horizontal section on the line 9—9 of Fig. 8. Fig. 10 is a transverse section on the line 10—10 of Fig. 4. Fig. 11 is a side view of the shell of the stapling tubes removed from the machine. Fig. 12 is a central longitudinal section through the stapling tube shown in Fig. 11 and on the line 12—12 of Fig. 14, a portion of the staples having been pushed out. Fig. 13 is the same before any of the staples have been fed out. Fig. 14 is a transverse section on the line 14—14 of Fig. 11 but on a larger scale. Fig. 15 is a horizontal section through the machine on the line 15—15 of Fig. 6, parts being broken away and parts in section. Fig. 16 is a plan view of the stapling bars and their mounting, parts being in horizontal section. Fig. 17 is a plan view of a portion of the left hand side of the machine, parts being broken away and the stapling bars being shown in dotted line beneath the stapling plate. Fig. 18 is a vertical section on the line 18—18 of Fig. 17. Fig. 19 is a longitudinal vertical section on the line 19—19 of Fig. 17, parts being broken away. Fig. 20 is the same with parts operated further than in Fig. 19, the stapling plate being pushed to its downward limit. Figs. 21, 22, and 23 are vertical longitudinal sections through the machine for applying the staples to the boxes being made and showing the parts in varying stages of operation. Figs. 24 and 25 are central vertical sections through the chute for conveying the ends of the boxes to place and showing the parts in different stages of operation. Fig. 26 is a side elevation of the said chute, part being centrally broken away. Figs. 27 and 28 are horizontal sections on the line 27—27 of Fig. 26, showing the parts in different stages of operation. Fig. 29 is a section on the line 29—29 of Fig. 26, but on a larger scale. Fig. 30 is a transverse section of the machine on the line 30—30 of Fig. 1. Fig. 31 is the same with the parts in the different stages of operation. Fig. 32 is a vertical section on the line 32—32 of Fig. 4. Fig. 33 is a vertical longitudinal section on the line 33—33 of Fig. 30. Fig. 34 is a side elevation of the stapling plates with tubes in position, parts being broken away and parts in section. Fig. 35 is an end elevation of what is shown in Fig. 34 with the bottom stapling tubes broken away. Fig. 36 is a horizontal section on the line 36—36 of Fig. 34. Fig. 37 is the same with the parts in a different position. Fig. 38 is a section on the line 38—38 of Fig. 37. Fig. 39 is the lower left hand corner of what is shown in Fig. 34 enlarged. Fig. 40 is an elevation of the lower end of one of the stapling tubes. Fig. 41 is a horizontal section on the line 41—41 of Fig. 34. Fig. 42 is a vertical section on the line 42—42 of Fig. 41. Fig. 43 is a vertical transverse section on the line 43—43 of Fig. 34. Fig. 44 is a side elevation of the folding mechanism, parts being broken away and a part in section. Fig. 45 is a perspective view of the end stapling frame. Fig. 46 is a side elevation of the toggle bars which are pivoted to the lateral stapling plates, parts being broken away. Fig. 47 is a section on the line 47—47 of Fig. 46.

The construction shown in the drawings for the purpose of illustrating the general nature of this invention will now be explained. In the first place the article to be manufactured by this machine is a box such as shown in Fig. 2. The sides, bottom and top of the box are formed of pieces of wood 50 of substantially the same form and character. These boards 50 are independent of each other when they are first introduced into this machine and each one before it comes to this machine preferably has a flange 51 on each end substantially as shown. Four boards 50 are tied together by wires 52 and staples 53 as shown, they being fastened preferably at both ends and midway between their ends. End boards 54 are afterward united with the ends of the boards 50 by staples that extend through the flanges 51. The resulting box, therefore, is complete and provided with a lid as shown.

The boards 50, four in a row or series as shown in Fig. 3, but without any tie wire connecting them, are placed in a feeding chute 55, as shown in Fig. 1 and the bottom series of the pile of boards 50 is removed from under the pile at each operation of the machine and that series makes a box. The feeding chute is formed by the plates 55 that are at their lower ends secured upon the side frames 56 of the machine, as shown in Figs. 1 and 4. These side frames are preferably made of cast iron and are of considerable length as seen in Fig. 1 and are preferably skeleton frames as shown. The two side frames 56 are connected and held in place by various parts of the mechanism and also by cross rods 57. They have no function except tying these two things together.

The boards 50 are fed to the left from under the pile, as shown in Fig. 1, four of the series at a time successively by the sliding feed plate 58, shown best in Fig. 6, from the under side of which arms 59 extend downwardly in which a transverse rod 60 is mounted that is connected at one end to a connecting rod 61, seen in Figs. 1 and 4. This connecting rod is formed of two pieces overlapping each other and provided with a series of holes 62 through which bolts 63 extend whereby the length of the bar may be adjusted. At its front end said bar 61 is fulcrumed to a wheel 64 by the pin 65, as shown in Fig. 1. The rod 61 is mounted at some distance from the center so that at each revolution of said wheel 64 the feed plate 58 is moved forward to its limit and then back to the starting point, as shown in Figs. 1 and 6. The arms 59 referred to above extend out through suitable slots 66 in the stationary plate 67, seen in Figs. 5 and 6. The box boards 50 and the feed plate 58 move upon this plate 67 to the left from their positions in Fig. 6.

The wheel 64 is mounted on a shaft 70 extending horizontally through the machine and has secured to it a gear 71, see Figs. 4 and 7, which meshes with and is driven by a pinion 72 under it on the shaft 73 that is mounted in one side of the frame 56 and the bracket 74, see Fig. 5, and is driven by a belt from some suitable source of power acting on the pulley 75. A clutch mechanism 76 operated by the lever 77 turns the pinion 72 into operative connection with the shaft 73, and by the above means the wheel 64 is driven. Each operation of the wheel 64 above described moves one set or series of four boards 50 from the chute, see Fig. 6, to the left upon the series of stapling bars 80, see Figs. 6, 16, and 19 and the little rollers 81 carried by spring arms 82 secured at intervals to magnetized bars 83. The stapling bars 80 are mounted stationary at each end in the side frames 56, as seen in Fig. 16 and are zig-zag in shape. As shown in Fig. 21 the stapling bar 80 lies between the magnetized bar 83 and the staple holding bar 84. These three bars, 80, 83 and 84 are zig-zag and parallel with each other, as shown in Fig. 16 but in cross section they occupy the relation to each other shown in Figs. 19 to 23. The magnetized bar 83 is fastened to the stapling plate 85 at each end by the arm 87 and extends out to a point below the stapling bar and its lower edge is turned at a right angle and to it the staple holding bar 84 is secured along its lower edge. The staple holding bar 84 and the magnetized bar 83 are vertically movable with reference to the stapling bar 80 by reason of the connection of the bar 83 with the staple plate 85. The plate 85 is elevated and lowered by the pins 90, see Fig. 18, projecting from each side loosely into vertical slots 91 in the plates 92, one of which is at each side of the machine and secured by the bolts 93 to the chute 55 at one end and to the stands 94 at the other end, as seen in Figs. 1 and 4.

On each side of the machine there are three links 95 which are pinioned at the lower ends to the pins 90 and at their upper ends to bars 96 which are carried by rollers 97 in the horizontal slot or track-way 98 in the plate 92, see Figs. 1, 18 and 19. The slide bars 96 are actuated by the means shown in Figs. 6, 8 and 9. As seen in the latter figure, the bars 96 have on their ends a pin 99 in the cam shaped groove 100 in the cam disk 101 secured on the shaft 70, see Fig. 7. I should explain that the shaft 70 is mounted in two stands 102 that are secured upon the side frame 56, see Figs. 4 and 6.

When the series of four boards 50 are moved in upon the stapling bars 80 as heretofore explained, the stapling plate 85 is held in the elevated position shown in Fig. 19 by the arms 95 seen in Figs. 6 and 19. Then the pins 95 of the bars 96 are in the position shown in Fig. 6, that is in the portion of the groove 100 which is opposite that part of the groove which is most remote from the axis of the cam 101. With the plate 85 in its upward position there is ample clearance for the movement of the boards 50 under it. The subsequent movement of the cam 101 will force the plate 85 downward from the position shown in Fig. 19 to the position shown in Fig. 20, and such downward movement of plate 85 forces the boards 50 downward likewise and also carries downward the magnetized bars 83 and the staple-carrying bars 84, as seen in the last mentioned figure.

As shown in Figs. 1, 2 and 6 there are three reels 105 mounted loosely on the rod 106 mounted in the stands 107, one stand being secured to each side frame 56. From these reels wires 52 are unwound by means in the machine hereafter to be explained drawing said wires from the reels. Brake levers 109 engage said reels to retard their revolution somewhat, said brake levers being fulcrumed on the rod 110 in the stands 111 and held in engagement with the reels by the weight 112. From the reels the wires 52 pass about the rollers 113 and 114, seen in Fig. 6, and from the latter roller they extend horizontally over the stapling bars 80, staple carrying bars 84 and the magnetized bars 83, as seen in Figs. 6, 18 and 19. The magnetized bars 83 have notches 120 in their upper edges, see Fig. 18, in which said wires lie. By this means said wires are held against the under side of the boards 50 and are secured thereto by staples 53 which are inserted from the under side, as seen in Figs. 21 to 23. These staples are inserted astride said binding wires, as shown in Fig. 2.

The means for applying the staples to the boards 50 for securing the wires 52 thereto will now be explained. A number of staple tubes, 125, see Fig. 11 are mounted obliquely with the open end upward, as seen in Figs. 6, 19 and 21. These tubes are secured in frames 126, see Fig. 6. There are three of these frames in the machine as shown and they are held in place by the two cross bars 127 which have in their opposing faces notches 128 which receive the ends of thumb screws 129 that pass through the side bars of said frame for clamping and holding said frames in place. This renders said frames readily removable and they are removed for filling the tubes 125 with staples. The notches 128 are in alinement with the notches 120 of the magnetic bar 83, so that the frames 126 are adjustable to boxes of different lengths. The staples are pushed upward out of said tubes 125 by the followers 131 on the rod 134. The staple tube 125 is formed as shown in Fig. 14, in cross section where it appears to have two sides, spaces or chambers through which the staples may be moved. While in said tube the staples ride or rest upon a central partition-like rib 130 and are pushed upward out of said tube by the follower 131 shaped as shown in Fig. 14, somewhat the same as the staple only the arms thereof are formed of a wider plate, and a projection 132 extends upward from said follower through the slot 133 in the tube 125 that extends longitudinally thereof and said projection 132 is secured to the rod 134 which slides through a plate 135 and has a turned up extreme end 136 and is actuated by a spiral spring 137 that tends to contract and to push the rod 134 and follower 131 from the position shown in Fig. 13 to that shown in Fig. 12 or Fig. 11. While the tubes 125 are being filled, the rods 134 are held downward by the rod 138 in the frame 126. After all the tubes 125 are filled with staples, the rods 134 are released from the rod 138 and thereupon the springs 137 act to feed the staples up.

Referring now to Figs. 19 to 23 it is seen that the beveled ends of the tubes 125 are placed against the staple supporting bars 84 and said bars have notches or seats 140 along their upper edges which register with the upper open ends of the tubes 125 when said bars 84 are pushed downward, as shown in Fig. 20. When this occurs the upper foremost staple in the tube is moved into said notch as shown in Figs. 22 and 23. The magnetic bars 83 coöperate with the springs 137 and the followers 131 to move the staples forward in said tubes and especially when a staple has entered the notch 140, as shown in Fig. 25, the magnetic bar 83 attracts the point thereof and when the bar 84 has been moved forward as far as in Fig. 21, it attracts a whole staple into the position shown by the upper staple shown in Fig. 21, that is with the back of the staple upon the top edge of the bar 80. Then the staple is in position to be inserted into the board 50 and this occurs when the board is pressed downward from the position shown in Figs. 19 and 21 to that shown in Fig. 22. When the staple enters the board as shown in Fig. 22, it is astride the wire 52. After the plate 85 is elevated toward the position shown in Fig. 19, the springs 82 push the boards 50 upward to the position shown in Fig. 23, and then the staple already driven is lifted entirely above the magnetic bar 83 and then the boards with the staples in them can be fed further on without obstruction. The plates 83 and 84 are made zig-zag so as to present inclined surfaces against which the staples are fed and held while they are being applied to the boards 50 so that the staples are driven into the boards at an inclination to the grain. The staple plate 85 has slots 170, see Fig. 10, for the bolts 171 which secure the guides 172 between which the boards 50 are guided in their movement and there is also a bolt 173 about midway the carrying bar 174 against the under side of which the boards 50 rest while the staples are being inserted and that bar 174 clenches the middle row of staples which are shorter than the staples that are driven in at the ends of the boards through the cleats or flanges 51.

From the foregoing it is seen that all the staples inserted to bind the wires 52 to four boards are driven into place at one time and operation of the machine and then the set of boards into which the staples have been driven are pushed forward by the following series of boards As the stapled series of boards advances it passes between the rollers 143 and 144, on the shaft 142 and 342 respectively, see Fig. 6 which bend down the ends of the staples and clench them. The roller 143 is driven by the pinion 145, see Fig. 1, that meshes with the segmental or mutilated gear 146 of the wheel 64, see Fig. 7. This gear 146 is so located on said wheel 64 and of such length as to operate the roller 143 at the right time and only at the time while the boards 50 are passing between said rollers. The lower roller 144 is actuated by the frictional engagement of the stapled boards 50 as they pass through. After the series of boards pass through the rollers 143 and 144, they stop in the position shown in Fig. 6 under the cam disk 101 where they rest upon a plate 150 secured to the side frames 56. The plate 150 has suitable guides 350 for holding the box blanks in alinement with the stapling construction. These guides are adjustable to boxes of different widths by a series of holes crosswise of the plate. In this position said series of boards is not acted upon but they have the function at that time of holding the wires 52 taut between them and the reels. Another operation of the machine causes the succeeding series of boards to push the series which were under the cam disk 101 to the left hand position shown in Fig. 6 and to the left of the wire cutting mechanism. This wire cutting mechanism is for the purpose of severing the three longitudinal wires 52, as shown in Fig. 6. At each side of the machine there is a stand 160 between which a knife 161 extends with its cutting edge downward and slightly above the bound boards 50. A companion knife 162 is mounted below it on arms 163 that extend from the shaft 164 mounted in the frames 56 and this knife is actuated by the cam 165 shown by dotted lines in Fig. 1, of the inner surface of the wheel 63 at each revolution engaging the arm 166 that extends from said shaft 164. This throws the lower knife 162 up toward the upper knife and severs the wires 52 between them. This wire-severing operation separates the series of boards 50 bound together by wire ready to be formed into the box by suitable folding means. The folding of the box takes place while the wires 52 are being cut as has been described and by the following mechanism.

By referring to Figs. 4, 5, 6, 33 and 44 the folding mechanism will be largely understood. As seen in Figs. 4 and 5 a plate 200 is adjustably mounted on the side frames 56 by bolts 401 extending through slots 402 in said plate whereby it may be adjusted with reference to the scale 203 shown at the left hand end of Fig. 1 to accommodate the folding mechanism to boxes of different sizes.

A cross bar 205, seen in Fig. 5, is mounted opposite one edge of the plate 200 by means of screw bolts 206 that are secured to said bar 205 and screwed into the plate 200, as seen in Fig. 4. A rod 207 is mounted transversely in said plate 200 and also a similar rod in the bar 205. To these rods folding arms 208 are rigidly secured, there being several on each side, as shown in Fig. 5. At each side of the machine a crank 209 is also rigidly secured to the rod 207, and said crank is operated by an irregularly shaped frame 210 that is elevated in its operation by an eccentric 211 on a shaft 212. A pair of ears 213 extend downwardly from the middle of each frame 210 astride the cam, as seen in Figs. 31 and 44.

The shaft 212, seen in Figs. 4 and 7 is driven by a sprocket wheel 214 and a sprocket chain 215 running from a gear 216 on the shaft 142, as seen in Fig. 7. It is obvious that during each revolution of the cam 211, shown in Fig. 44, the vertical movement of the frame 210 will, through the cranks 209, fold the folding arms 208 to a vertical position, as seen in Fig 33, with the boards in the position shown at the left hand end of Fig. 31, with one board 50ª over the middle portion of the folding mechanism, as seen in Fig. 33, and the boards 50ᵇ, one on each side of the board 50ª, resting upon the folding arms 208 when in the position shown in Fig. 44. When the folding apparatus is operated as shown in Fig. 33, the two side boards 50ᵇ are folded to a vertical position, and the fourth board 50ᶜ which forms the top of the box is hanging out, as shown in Fig. 33, where it is partly broken off. This will explain how the bottom and two sides and top of the box are formed. However, before this folding occurs, the end stapling frame moves down upon the bottom boards 50ª, as seen in Figs. 30 to 33. This frame reciprocates vertically in two guide-frames 220 extending upwardly and carried by arms 221 that are secured to the plate 200, as seen in Fig. 4, by bolts 222 passing through slots 223 that extend transversely in the plate 200, whereby said guiding frames 220 are adjustable away from or toward each other to accommodate boxes of varying sizes, as the stapling frame which reciprocates vertically between said guide ways is also adjustable in width. The arrangement of the guide-frames 220 will be understood further by an examination of Figs. 24 to 29. The guide frames are supported some distance above the plate 200 so as to leave room below for the box being made. The end stapling frame, as shown in Figs. 30 and 31, consists of two cross bars 230 and 231 that are secured at each end to a plate 232 that slides against said guide frames and are guided by pins 233 that extend from the plate 232 and project through the slots 234 in the guide plate 220, as seen in Fig. 1. As shown in Figs. 1 and 4, said part of the end stapling frame is elevated and lowered by the arms 235 that at one end are pivoted to said frame and extend rearwardly and are provided with a long slot 236 at the rear end and are fulcrumed on a shaft 237 which is mounted in the stands 94 extending up from the side frames 56. Said arms 235 are actuated by the cams 101 said cams engaging a roller 238 on a bracket 239 secured to the side of the arms 235, as seen in Figs. 1 and 4. Said shaft 237 is actuated as shown in Fig. 7 by a chain 240 and sprocket wheels 241 and 242 on the shaft 142.

As seen in Figs. 30 and 31, the bars 230 and 231 are horizontally slotted at 246 to receive bearing plates 247 held by bolts 248. A crank 250 is mounted in said bearing plates and actuates the connecting bars 251 and 252 arranged tandem as shown, and they are in turn pivoted to two pairs of toggle bars 253 which are pivoted to lateral staple plates 254 which are normally drawn toward each other and out of the driving position by springs 255 connecting them. When the crank shaft 250 is actuated, the parts will be moved from the position shown in Fig. 31 to the position shown in Fig. 30 and during such movement the staples for securing the ends of the box in place will be driven. The toggles 253 are provided with any common means, Figs. 46 and 47, for clamping them together to shorten or lengthen the same and thus adjust the same to varying sizes of boxes.

As was stated above, the sides of the box are folded up against this frame which has just been described, and into the position shown in Fig. 33. Then the ends 54 are fed down into place, as shown in Figs. 24 to 30. As seen in Fig. 24, a succession of end boards are fed down through a chute 260 and are at their lower ends connected with the upper edge of the guide frames 220 through which a guide way 261 continues, as shown in Figs. 24 and 25. The chutes 260 are long enough or high enough to admit a number of box ends 54 and feed down by gravity until they reach the lower part of the guide frames 220. The inner part of said guide frames are provided with slots 263 that contain serpentine springs 264 that are fastened to a flange in the guide frames 220 and that are so bent as to be engaged by the downwardly moving plate 232 on the frame, and when so engaged said springs 264 will engage the second box end from the bottom and for a time hold it from descending. As the end stapling frame continues to move further down, its lower portion comes into engagement with the inclined springs 265 and forces the sliding horizontal plate 266 inward so that a slot 267 therein will register with the conduit 261 through which the box ends descend. When said plate 266 is in its normal position, as shown in Fig. 29, no box end can descend below it. But when the end stapling frame is down to its lowest limit, the plate 266 is actuated and the box ends descend at about the same time that the sides of the boxes are folded up against said end stapling frames and said box ends.

To adapt the chute for box ends of varying widths, horizontal slots 270 are provided in the lower part of the plate 220 through which a bolt 271 extends at each side and at the top of the chute 260 there is a corresponding slot 272 to receive corresponding bolts 271. A bar 273 extends from the top to the bottom bolt of each side between the pair of plates in the chute 261. These bars can move closer to each other or farther apart to reduce or increase the width of the chute, for the purpose indicated by loosening and tightening the nuts on the bolt 271.

After the box ends have been fed down, fingers 275, seen in Figs. 30 and 33, secured to the vertically slidable end stapling frame and the spring fingers 276 on the head 277 hold the box ends in a vertical position, as shown in Fig. 30, and while they are being secured by staples. The staples are driven against the head 277. The construction of this head is shown in Fig. 32 where it is shown provided with a sleeve 278 surrounding the end of the shaft 279 mounted in stands 280 on the adjustable plate 200. The shaft 279 has a head 281 on it within said sleeve 278 and a spiral spring 282 surrounds said shaft pressing against the plate 281 at one end and the plate 283 secured to the sleeve 278 at the other end, so as to move the sleeve 278 normally to the left against the cam surface of the head 284 secured on the shaft 277. There is a cam surface on the adjacent ends of said head 284 and sleeve 278, so that as the shaft 279 is revolved, the head 278 will be reciprocated. The shaft 279 is actuated by a sprocket wheel 285 over which a sprocket chain 286 runs from a sprocket wheel 287 on the shaft 212, seen in Fig. 30.

During the driving of the staples the plate or head 277 is pressed inward so as to occupy the position shown in Figs. 30 and 32. And it thereby causes the ends of the staples to be bent and clenched. After the staples are driven, the head 277 moves away, as shown in Fig. 31, so as to disengage the box.

The means for carrying and supplying staples to the box ends are shown in Figs. 34 to 43 and are movable with what has been called the end-stapling frame. As seen in Figs. 36 and 37, on one side of the staple driving plate 254 there is a plate 290 secured to the cross bar 231 of the reciprocal frame, as seen in Fig. 31. On the opposite side of the staple driving plate 254 is located a magnetic plate 291 and the three plates are held together by bolts 292 and in the plate 290 and extending through slots 294 in the staple driving plate 254 and slots 295 in the magnetic plate 291, so that the two latter plates are movable.

The means for actuating the plate 254 has heretofore been described. The magnetic plate 291 is actuated by the pushing spring 296 which is mounted between the flange 297 on the plate 254 and the edge of the plate 291, as shown in Figs. 36 and 37. Hence, as the plate 254 moves to the left from the position shown in Fig. 36 it pushes the plate 291, as seen in Fig. 37, until said magnetic plate 291 engages a board of the box and stops, but the plate 254 continues in its movement in order to force in the staples. A similar construction is provided for the bottom of the box, as seen in Figs. 34 and 39. There the bottom staple driving plate 298 is driven by a flange 299 from the plate 254 on the sides, and it slides under the stationary plate 300 that corresponds with the plate 290 and over a magnetic plate 301 which is driven by a spring 302 in the same manner as the construction at the sides, as shown in Fig. 36.

The staples are introduced between the plates 290 and 291 at the sides and the plates 300 and 301 at the bottom through holes 303 and 311 in the plates 290, and in advance of the staple driving plates 254 and 298 respectively. The staples for the holes in the side plates 290 are supplied from the oblique staple holding tubes 305 that are near their middle secured by brackets 306 to a vertical bar 307 and at their lower ends have catches 308 that engage lugs 309 on the plate 290. The tubes 305 are shaped in cross section, as shown in Figs. 41 and 42, substantially the same in shape as the tubes 125 excepting that in the former the staples are fed down by gravity alone but the shape of the tube holds the points of the staples to the left, as shown in Figs. 41 and 42. The staples for the right and left side rows, as shown at the end of Fig. 2 on the box, are supplied by the tube shown in Fig. 34 just described. The bottom row of staples shown in Fig. 32 are supplied by vertical tubes 310, seen in Fig. 35. These tubes 310 are the same in cross section as the tubes 305 and the staples feed therefrom from openings 311 in the plate 300 similar to the openings 303 in the plate 290. The tubes 310 are held by arms 312.

The means for operating the crank 250, shown in Figs. 31 and 33, is actuated by the shaft 313, seen in Fig. 4, that at one end is connected to the crank shaft 250 by a joint 411, as seen in Figs. 3 and 33, and at the other end extends through a bracket 314 that is fulcrumed loosely on the shaft 237. The shaft 313 is driven by a beveled gear 315 on it and the beveled gear on the shaft 237. The shaft 313 is formed of two parts adjustably connected at their ends so that the shaft can be adjusted in length as when the frame in the crank shaft 250 is mounted is altered to adapt it to boxes of different sizes.

After the box has been folded and stapled, the interior forms mounted on the sliding plates 232 are lifted by the action of the cams 101 on the arms 235. This clears the interior of the box. At the same time the recessed part of the sleeves 283 are opposite the cams 284 and this enables the springs 282 to move the stapling or abutting plates 277 out of engagement with the box and makes a clearance that enables the operator to first move the box endwise toward one of the abutments 277 and then turn the box out by the center standard 221. The clearance is ample for quick operation.

As seen in Fig. 43, the parts 300, 298 and 301 are not adjustable in themselves, but for boxes of different widths they are replaced by a set of parts suitable for a wider or narrower box. The substitution of the set of parts is cheaper than to make the parts adjustable in themselves.

While I have shown a machine for illustrating my invention that has various details of construction peculiar to it, I do not wish to be limited to the details shown and described.

It is observed that this machine applies ready made staples to the boards forming the boxes and therein is different from machines which form the staples as they are inserted in the box boards.

What I claim as my invention and desire to secure by Letters Patent is:

1. A machine for making boxes including means mounted on the frame for holding super-imposed layers of box boards for forming boxes, mechanism for securing connecting means to the boards after they have been pushed partly through the machine, means for retarding the movement of said connecting means and the boards connected therewith, and a reciprocating pusher mounted in the frame and adapted at each operation to engage the lower boards and push the same including those which have been secured to the connecting means through the machine.

2. A machine for making boxes including means mounted on the frame for holding super-imposed layers of box boards for forming boxes, mechanism for securing connecting means to the boards after they have been pushed partly through the machine, a reel from which said connecting means is unwound, pulleys over which said connecting means passes, means for retarding the movement of the reel, and a reciprocating pusher mounted in the frame and adapted at each operation to engage the layer of boards and push the same including those which have been secured to the connecting means through the machine.

3. A machine for making boxes including means for supporting connecting means to be secured to a series of box boards, means for moving such series of box boards upon said connecting means, means for holding staples stationary under said box boards astride said connecting means with the points upward, and a plate for forcing said box boards downward, to effect the insertion of the staples.

4. A machine for making boxes including means for supporting connecting means to be secured to the box boards for connecting them, means for moving a series of box boards upon said connecting means, a plate upon said box boards for holding them down upon the connecting means, and means for applying staples to the under side of said boards astride said connecting means.

5. A machine for making boxes including a series of stationary staple bars, means for feeding staples to said bars with the points upward, mechanism for moving wires or the like connecting means over said staple bars and between the members of the staples, means for moving box boards over said wires, and a plate for forcing said box boards downward to cause the staples to enter the boards.

6. A machine for making boxes, including a series of stationary staple bars, a magnetized bar adjacent said staple bar and vertically movable, a staple receiving bar on the other side of said staple bar and having recesses in the upper part thereof, upwardly inclined staple holding tubes with the upper ends engaging said staple receiving bar, a spring for pushing the staples upward in said tube, mechanism for holding wires or like connecting means between the members of the staples, and means for pressing box boards downward so as to cause the staples to be driven therein.

7. A machine for making boxes, including means for holding staples with their points upward, means for conveying the box boards over said staples, a plate above said box boards with laterally projecting pins therefrom, stationary side bars with vertical slots into which said pins project, a horizontal reciprocating bar at each side of the machine, and a connecting rod from each of said bars to said pins, whereby said plate can be forced down upon said box boards and elevated therefrom.

8. A machine for making boxes, including means for holding a plurality of series of box boards, mechanism for securing connecting means to a series of said box boards, means for severing said connecting means, means for folding the box boards, all of said means being arranged successively, and means for moving each series of box boards successively to the positions for the action of the said several means.

9. A machine for making boxes, including a mechanism for affixing connecting means to a series of box boards, means for moving the series of boards to position for affixing thereto said connecting means, means for moving the various forward series of box boards by pushing against the last series of box boards, rollers adapted to engage said box boards after they have been connected together and further move said series of box boards into the position for the next action thereon by the machine, and means for actuating said rollers only a portion of the time that the other mechanism is operated.

10. A machine for making boxes, including means for flexibly uniting three or more box boards successively together in series, and means for folding the boards on the opposite sides of the middle board to positions at right angles to said middle board.

11. A box making machine, including means for connecting a series of box boards together in series, means for folding the same, comprising a central stationary portion on which the middle board rests, and a folding side portion pivoted to each side of said central portion for folding the boards on the two opposite sides of the middle board.

12. A machine for making boxes, including means for connecting a plurality of box boards in series, a folding mechanism comprising a central stationary portion upon which the middle board of the series may rest, a frame for supporting said central portion that is adjustable, and a lateral portion pivoted to each side of said central portion for folding the boards on the opposite sides of said middle board.

13. A machine for making boxes, including means for connecting a plurality of box boards in series, a folding mechanism comprising a central stationary portion upon which the box boards may rest, a side portion pivoted to each side of said central portion for folding the boards on the opposite sides of said middle board, cranks extending from the side portions near the pivotal point thereof, and a vertically reciprocable frame connected with the cranks at each side for forcing the same upward to move said side portion to vertical positions.

14. A machine for making boxes, including means for connecting a plurality of box boards in series, a folding mechanism comprising a central stationary portion, a side portion pivoted to each side of said central portion for folding the boards on the opposite sides of said middle board, cranks extending from the side portions near the pivotal point thereof, a vertically reciprocable frame connected with the cranks at each side for forcing the same upward to move said side portion to vertical positions, a shaft under said frames and eccentrics secured thereon that engage the under side of said frames to force the same upward.

15. A machine for making boxes, including means for connecting a plurality of box boards in series, mechanism for folding the boards on the opposite sides of the middle board to positions at right angles to said middle board, means for inserting end boards while said side boards are in their folded positions, and means for securing the end boards to the other boards.

16. A machine for making boxes, including means for securing a number of box boards together in series, a frame adapted to move downwardly into engagement with the middle board, means for folding the side boards against said frame, and means actuated by said downwardly moving frame for bringing the ends of the boxes into place between the sides.

17. A machine for making boxes, including means for securing a number of box boards together in series, a frame adapted to move into engagement with the middle board, means for folding the side boards against said frame, means actuated by said downwardly moving frame for bringing the ends of the boxes into place between the sides, and means mounted in connection with said frame for inserting the fasteners from the inside through said ends for securing them in place.

18. A machine for making boxes, including means for holding the bottom and sides of the boxes in place, a number of chutes in which the end boards are placed one above the other, movable means for supporting the lower end board, and a frame movable downwardly upon the bottom board of the box that releases said end board supports and permits the end boards to move down into place in the box.

19. A machine for making boxes, including means for holding the bottom and sides of the box, chutes adapted to contain a number of end boards one above the other edgewise over their proper place in said box, a perforated spring held slide plate at the bottom of each chute in position normally to support the lower end board, and a frame movable down into the box on the bottom that moves said slide plate so that the end board will pass through the slot therein into place.

20. A machine for making boxes, including means for holding the bottom and sides of a box, an end board chute over each end of the box adapted to contain a number of end boards edgewise one above the other, means for supporting the lower end board, a frame movable down upon the bottom of the box that releases said means, and means in each chute actuated by said frame for engaging the next to the bottom end board and holding it from downward movement while the lower board is moving into position in the end of the box.

21. A machine for making boxes, including means for holding the bottom and side boards of the box, a frame movable down upon the bottom of the box, means for guiding the end boards of the box into position adjacent said frame, means carried by said frame for inserting staples from the inside into said end boards, and plates for holding said end boards for clenching the ends of the staples.

22. A machine for making boxes, including means for holding the bottom and side boards of the box, a frame movable down upon the bottom of the box, means for guiding the end boards of the box into position adjacent said frame, means carried by said frame for inserting staples from the inside into said end boards, plates movable into position for holding said end boards for clenching said staples, and means for withdrawing said plates after the staples have been inserted.

23. A machine for making boxes, including means for folding the side boards to positions at right angles with the bottom box board, means for supplying end boards between said side boards, means for inserting staples from the inside in said end boards to secure them in place, clenching plates, means for moving the clenching plates against the outside surface of said end boards, and a single mechanism for operating all of said means simultaneously.

24. A machine for making boxes, including means for holding the bottom and side boards of the box, means for inserting end boards of the box between said side boards, plates adapted to resist movement of said end boards, a frame movable down into said box, plates laterally movable in said frame carrying staples, and means for forcing said staple carrying plates toward said end boards for driving the staples into the end boards.

25. A machine for making boxes, including means for holding the bottom and side boards of the box, means for inserting end boards of the box between said side boards, plates adapted to resist movement of said end boards, a frame movable down into said box, plates laterally movable in said frame carrying staples, connecting bars pivoted to each of said plates and extending toward each other midway between the plates, and a vertically movable bar pivoted to said connecting bars so that when it is forced downward said connecting bars will force said staple plates laterally against the end boards.

In witness whereof, I have hereunto affixed my signature in the presence of the witnesses herein named.

WILLIAM M. GENTLE.

Witnesses:
N. ALLEMONG,
OLIVE BREEDEN.